United States Patent
Hirai

(10) Patent No.: US 10,014,956 B2
(45) Date of Patent: Jul. 3, 2018

(54) OPTICAL RECEIVER MODULE

(71) Applicant: Oclaro Japan, Inc., Sagamihara, Kanagawa (JP)

(72) Inventor: Riu Hirai, Kanagawa (JP)

(73) Assignee: Oclaro Jaoan, Inc., Sagamihara (JP)

( * ) Notice: Subject to any disclaimer, the term of this patent is extended or adjusted under 35 U.S.C. 154(b) by 0 days.

(21) Appl. No.: 15/365,992

(22) Filed: Dec. 1, 2016

(65) Prior Publication Data

US 2017/0180057 A1    Jun. 22, 2017

(30) Foreign Application Priority Data

Dec. 16, 2015  (JP) .................................. 2015-244841

(51) Int. Cl.
*H04B 10/25* (2013.01)
*H04B 10/69* (2013.01)

(52) U.S. Cl.
CPC ..... *H04B 10/6933* (2013.01); *H04B 10/2504* (2013.01); *H04B 10/697* (2013.01); *H04B 10/6931* (2013.01)

(58) Field of Classification Search
CPC ............ H04B 10/6931; H04B 10/6933; H04B 10/2504
See application file for complete search history.

(56) References Cited

U.S. PATENT DOCUMENTS

| | | | | |
|---|---|---|---|---|
| 7,173,551 | B2* | 2/2007 | Vrazel ................... | G11C 27/02 341/144 |
| 7,215,721 | B2* | 5/2007 | Hietala .................. | H04L 1/004 375/317 |
| 7,826,752 | B1* | 11/2010 | Zanoni ............... | H04B 10/5055 398/186 |
| 2012/0170931 | A1* | 7/2012 | Evans ................. | H04J 14/0227 398/48 |
| 2014/0334831 | A1* | 11/2014 | Kawazoe ............. | H04B 10/693 398/210 |
| 2017/0134097 | A1* | 5/2017 | Morie .................... | H04B 10/61 |

FOREIGN PATENT DOCUMENTS

JP             05-145360 A          6/1993

* cited by examiner

*Primary Examiner* — Dzung Tran
(74) *Attorney, Agent, or Firm* — Mattingly & Malur, PC

(57) ABSTRACT

Provided is an optical receiver module which includes a conversion unit which converts an input optical signal to an electrical signal, an amplification unit which amplifies the electrical signal and outputs an amplified signal, a reception unit which directly or indirectly receives the amplified signal, and an offsetting unit which offsets the electrical signal such that a difference between a center of an intensity width of the electrical signal and a center of an intensity range of a signal capable of being received by the reception unit becomes small.

10 Claims, 9 Drawing Sheets

OPTICAL RECEIVER MODULE

CROSS-REFERENCE TO RELATED APPLICATION

The present application claims priority from Japanese application JP 2015-244841, filed on Dec. 16, 2015, the content of which is hereby incorporated by reference into this application.

BACKGROUND OF THE INVENTION

1. Field of the Invention

The present invention relates to an optical receiver module.

2. Description of the Related Art

As a standard of an optical signal used for optical communication, a standard stipulated by a standardization organization such as the International Telecommunication Union Telecommunication Standardization Sector (ITU-T) or a standard such as IEEE802.3 is known. In these standards, as an optical signal modulation and demodulation scheme, an intensity modulation and direct detection (IM/DD) scheme may be adopted. In the intensity modulation and direct detection scheme, "0" or "1" of a signal is represented by a difference in intensity of the optical signal.

In JPH05-145360 A, an optical receiving circuit provided with an automatic gain control (AGC) circuit and obtaining an output with fixed amplitude with respect to variations in amplitude of an input electrical signal is described.

SUMMARY OF THE INVENTION

In recent years, in order to obtain a large amount of data communication, a multi-level intensity modulation of a value of a 4-ary (2 bits) or more has been performed in some cases. In multi-level intensity modulation, differences in the intensity of different optical signals may become smaller compared to in binary intensity modulation and an influence of noise may become more serious. Here, a magnitude of noise may depend on the intensity of the optical signal and magnitudes of noise may differ between different optical signals.

On the other hand, a reception unit receiving a signal may be formed to have a relatively wider range of an intensity of a receivable signal and amplify the signal and utilize the receivable range to the maximum to improve a reception accuracy.

In a case where magnitudes of noise may differ between different optical signals, when a signal is simply amplified, deviation in the signal intensity may occur and the receivable range of the reception unit may not be sufficiently utilized.

An object of the present invention is to provide an optical receiver module capable of receiving an optical signal with a high accuracy even when magnitudes of noise differ between different optical signals.

(1) In order to solve the problem described above, an optical receiver module according to the present invention may include a conversion unit which converts an input optical signal to an electrical signal, an amplification unit which amplifies the electrical signal and outputs an amplified signal, a reception unit which directly or indirectly receives the amplified signal, and an offsetting unit which offsets the electrical signal such that a difference between a center of an intensity width of the electrical signal and a center of an intensity range of a signal capable of being received by the reception unit becomes small.

(2) The optical receiver module described in (1) may further include a measurement unit which measures at least the maximum value and the minimum value of the intensity of the amplified signal in which the amplification unit may amplify the electrical signal such that the maximum value of the intensity of the amplified signal becomes less than or equal to the maximum value of the signal intensity range and the minimum value of the intensity of the amplified signal becomes greater than or equal to the minimum value of the signal intensity range.

(3) In the optical receiver module described in (2), the offsetting unit may include an offset amount calculation unit which calculates an offset amount of the electrical signal based on the intensity of the amplified signal measured by the measurement unit.

(4) In the optical receiver module described in (2), the offsetting unit may include a storage unit which stores a relationship between the intensity of the amplified signal and the offset amount and an offset amount selection unit which selects the offset amount of the electrical signal based on the intensity of the amplified signal measured by the measurement unit and the relationship between the offset amount and the intensity of the amplified signal stored in the storage unit.

(5) The optical receiver module described in (1) may further include an AD conversion unit which converts the amplified signal to a digital signal to be output to the reception unit.

(6) In the optical receiver module described in (1), the conversion unit may include an avalanche photodiode.

(7) In the optical receiver module described in (1), the optical signal is an optical signal amplified by an optical amplifier.

(8) In the optical receiver module described in (1), the optical signal is a multi-level optical intensity signal of a value of a 4-ary or more.

According to the present invention, an optical receiver module capable of receiving an optical signal with a high accuracy even when magnitudes of noise differ between different optical signals is provided.

DETAILED DESCRIPTION OF THE INVENTION

First Embodiment

Figure 1:
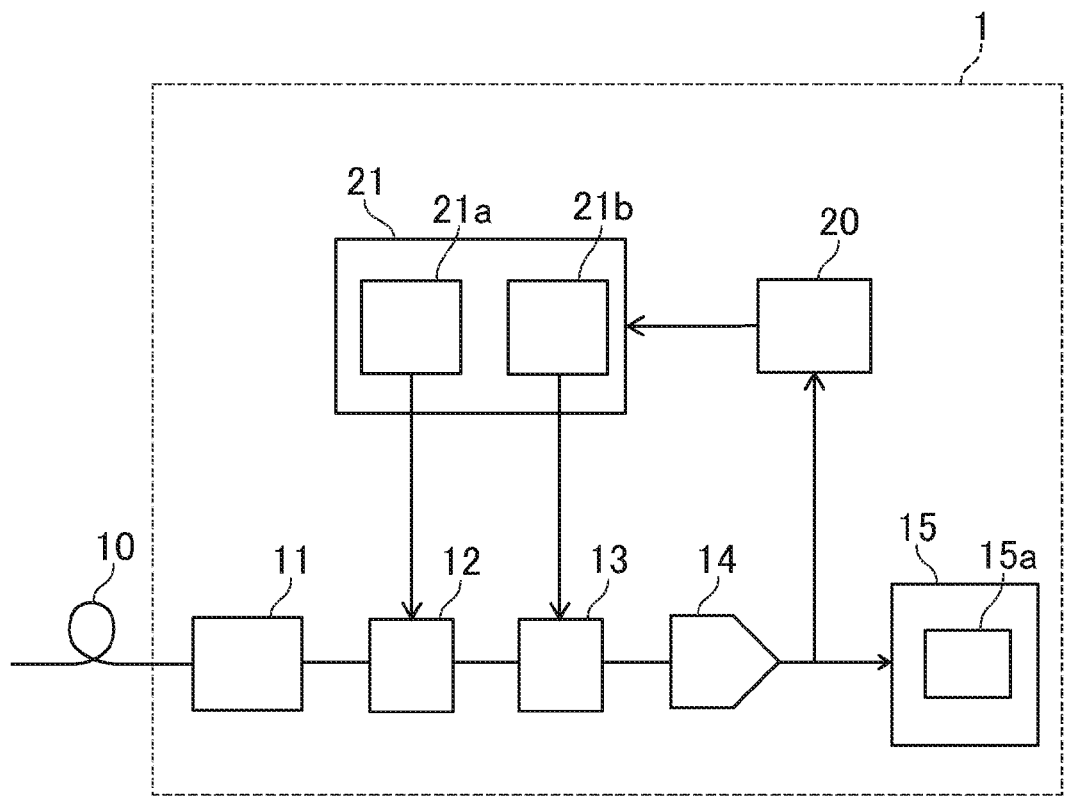
FIG. 1 is a diagram illustrating a configuration of an optical receiver module according to a first embodiment of the present invention.

In the following, embodiments of the present invention will be specifically described in detail based on the drawings. In all the drawings for describing the embodiments, the same reference numerals may be given to members provided with the same function and descriptions thereof will not be repeated. The drawings illustrated in the following are just for explaining examples of the embodiments and are not necessarily scaled to be identical with drawing sizes.

FIG. 1 is a diagram illustrating a configuration of an optical receiver module 1 according to a first embodiment of the present invention. The optical receiver module 1 may include a conversion unit 11 which converts an optical signal input from an optical fiber 10 into an electrical signal. The optical signal transmitted by the optical fiber 10 may be a multi-level optical intensity signal of a value of a 4-ary or more and in the following, description will be made on a case of a 4-ary optical intensity signal. The conversion unit 11 according to the present embodiment converts an optical signal into a photocurrent. The conversion unit 11 according to the present embodiment may include an avalanche photodiode, and may also include a pin photodiode or other photoelectric conversion elements. The conversion unit 11 maybe a unit converting an optical signal into a voltage signal.

The optical receiver module 1 according to the present embodiment may include an offsetting unit 12 which offsets an electrical signal output from the conversion unit 11 and an amplification unit 13 which may amplify the electrical signal and output the amplified signal. In a case where the electrical signal is a current signal, offsetting of the electrical signal refers to increasing or decreasing a DC component of a current. In a case where the electrical signal is a voltage signal, offsetting of the electrical signal refers to increasing or decreasing a DC component of a voltage.

The optical receiver module 1 according to the present embodiment may include a reception unit 15 which directly or indirectly receives the amplified signal output from the amplification unit 13. The reception unit 15 according to the present embodiment may include a compensation unit 15a which compensates waveform distortion. The compensation unit 15a compensates the waveform distortion of the optical signal caused by wavelength dispersion of the optical fiber 10. With this, the reception unit 15 is able to receive the optical signal with a higher accuracy.

The optical receiver module 1 according to the present embodiment may include an AD conversion unit 14 which converts the amplified signal output from the amplification unit 13 into a digital signal and outputs the converted signal to the reception unit. The reception unit 15 according to the present embodiment receives the digital signal output from the AD conversion unit 14 to indirectly receive the amplified signal. The reception unit 15 may directly receive the amplified signal which is the analog signal. The AD conversion unit 14 is provided and thus, the optical signal is received as the digital signal and an analysis using digital processing becomes easy.

The offsetting unit 12 according to the present embodiment offsets the electrical signal such that a difference between a center of an intensity width of the electrical signal and a center of an intensity range of a signal capable of being received by the reception unit 15 becomes small. In the following, behaviors of the offsetting unit 12 will be described with reference to FIG. 2 to FIG. 7.

Figure 2:
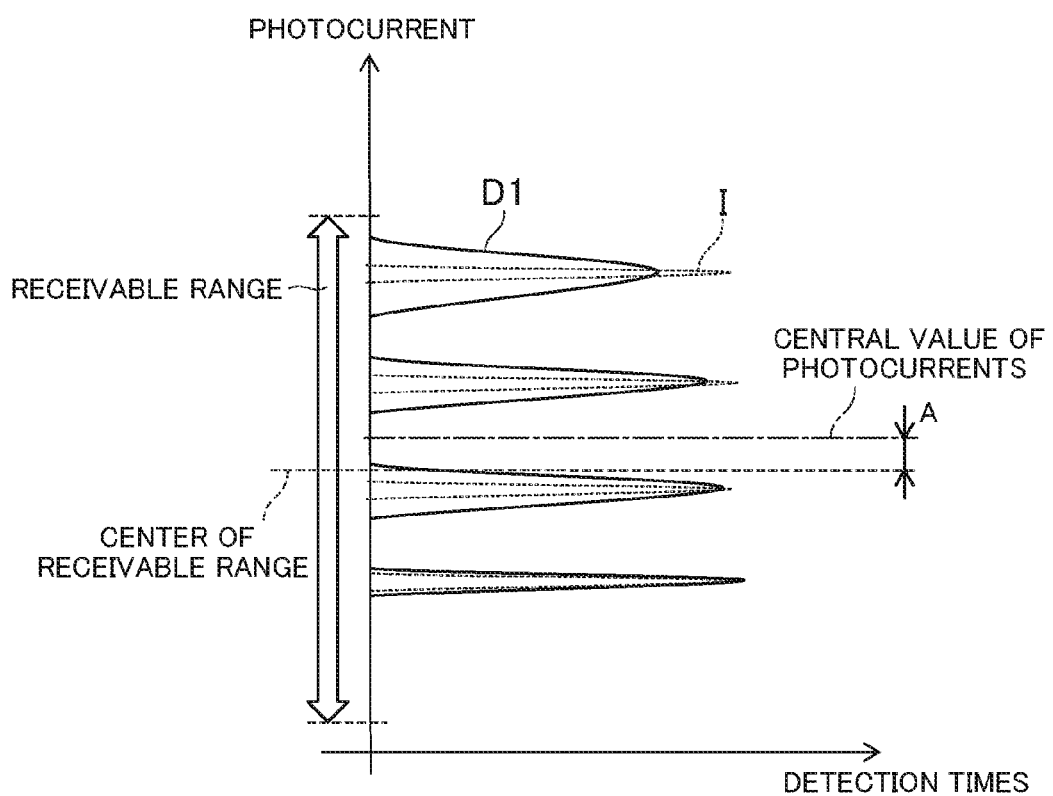
FIG. 2 is a diagram illustrating a histogram of a photocurrent output by a conversion unit and a receivable range of a signal by a reception unit in an optical receiver module of the related art.

FIG. 2 is a diagram illustrating a histogram of a photocurrent output by a conversion unit and a receivable range of a signal by a reception unit in an optical receiver module of the related art. In the same figure, a histogram of the photocurrent is illustrated by representing a magnitude of the photocurrent output from the conversion unit and the number of times of current value detection in the vertical axis and the horizontal axis, respectively. Four peaks illustrated in the histogram correspond to four signals of a 4-ary optical intensity signal. In the graph, an ideal histogram I representing non-existence of noise is illustrated with a dotted line and a real histogram D1 representing existence of noise is illustrated with a solid line. The histogram D1 may include a contribution of noise such as thermal noise or shot noise and has a distribution wider than that of the ideal histogram I representing non-existence of noise. Here, an area of the ideal histogram I equals to that of the real histogram D1. In particular, in FIG. 2, spreading of the distribution is emphasized to render the histogram D1 in order to allow the influence by noise to be easily understood. The noise may occur during transmission of an optical signal or during conversion of the signal by the conversion unit.

In the following, description will be made on what type of noise occurs in the optical signal in a case where an avalanche photodiode is adopted as a conversion unit converting an optical signal into a photocurrent. The avalanche photodiode receives an influence by the shot noise at a relatively strong rate and has characteristics that a noise level becomes larger as a light intensity is increased. For that reason, the noise occurring in the photocurrent after the conversion becomes not uniform for each signal. Specifically, the S/N ratio of the avalanche photodiode becomes a value represented by the following Expression 1.

$$\frac{S}{N} = \frac{I_L^2 M^2}{2q(I_L + I_{dg})BM^2F + 2qBI_{ds} + 4kTB/R_L} \quad \text{Expression 1}$$

Here, the M represents a multiplication factor, the $I_L$ represents a photocurrent when M=1. The q represents a charge amount per one electron, the $I_{dg}$ represents a dark current which is multiplied, the B represents a bandwidth, and the F represents an excess noise factor. The $I_{ds}$ represents a dark current which is not multiplied. The k represents a Boltzmann constant, the T represents an absolute temperature, and the $R_L$ represents a load resistance.

The "$2q(I_L+I_{dg})BM2F+2qBI_{ds}$" which is the first term and the "$4kTB/R_L$" which is the second term among an amount represented in a denominator of the right side of Expression 1 represent a contribution of the shot noise and a contribution of the thermal noise, respectively. In general optical fiber communication, in a case where the multiplication factor M is small, the shot noise is smaller than the thermal noise and the first term is negligible. The first term is increased in proportion to a square of the multiplication factor M and thus, the first term gradually becomes a non-negligible amount as the multiplication factor is increased. The second term is increased according to the magnitude of the photocurrent $I_L$. As a result, in a case where the avalanche photodiode is utilized, the S/N ratio becomes worse as the light intensity of the optical signal is increased.

In the optical receiver module of the related art, in order to utilize a signal intensity range (receivable range) of a signal capable of being received by the reception unit, the photocurrent is offset such that a central value of the photocurrent coincides with the center of an intensity range of a signal capable of being received by the reception unit. The central value of the photocurrent refers to a value of the photocurrent positioned at the center when the measured photocurrents are arranged from lowest to highest. In a case where the number of values of the measured photocurrents is an even number, an average value of two values adjacent to the center is set as the central value. An offset amount is expressed as a first amount A which is a difference between the central value of the photocurrent and the center of the receivable range of the reception unit.

Figure 3:
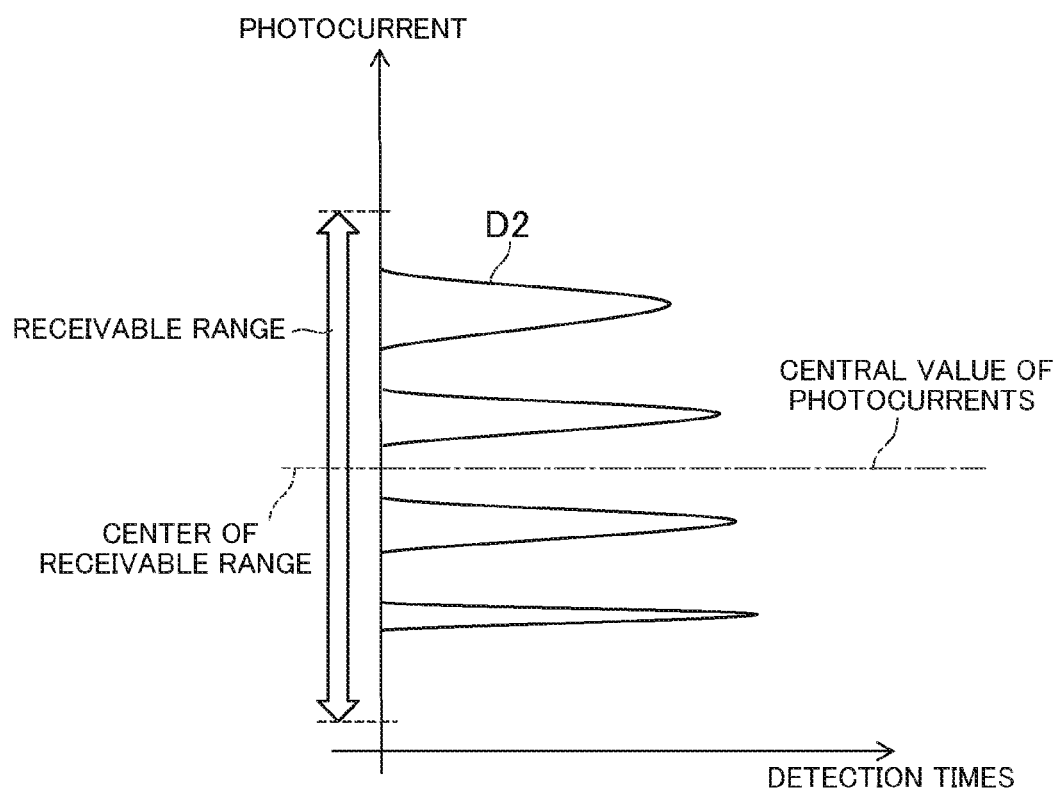
FIG. 3 is a diagram illustrating a histogram of an offset photocurrent and a receivable range of a signal by the reception unit in the optical receiver module of the related art.

FIG. 3 is a diagram illustrating a histogram D2 of an offset photocurrent and a receivable range of a signal by a reception unit in the optical receiver module of the related art. The photocurrent is offset by the first amount A and as a result, the central value of the photocurrent coincides with the center of the receivable range of the signal by the reception unit.

Figure 4:
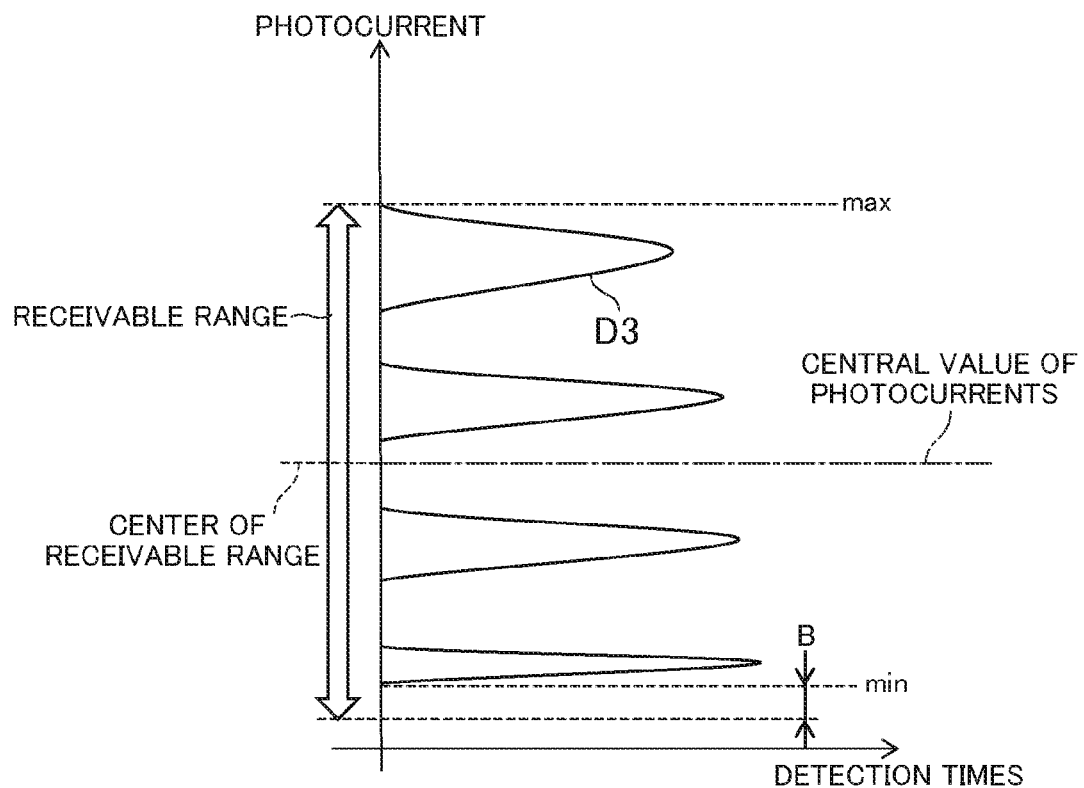
FIG. 4 is a diagram illustrating a histogram of an amplified photocurrent and a receivable range of a signal by the reception unit in the optical receiver module of the related art.

FIG. 4 is a diagram illustrating a histogram D3 of an amplified photocurrent and a receivable range of a signal by a reception unit in the optical receiver module of the related art. In the optical receiver module of the related art, the photocurrent is amplified such that both the minimum value and maximum value of the offset photocurrent do not exceed the receivable range of the signal by the reception unit. In a case of the present example, the photocurrent is amplified such that the maximum value (max) of the amplified photocurrent approaches the upper limit of the receivable range of the signal by the reception unit. With this, the minimum value (min) and the maximum value (max) of the amplified photocurrent fall within the receivable range of the signal by the reception unit. When offsetting and amplifying of the photocurrent described above are performed, a range of a second amount B at the lower limit side among the receivable range of the signal by the reception unit is not used. As such, in the receiver module of the related art, a range which is not used is generated among the receivable range of the signal by the reception unit, the receivable range of the signal by the reception unit is not able to be sufficiently utilized, and the reception accuracy of the optical signal is not sufficiently high.

Figure 5:
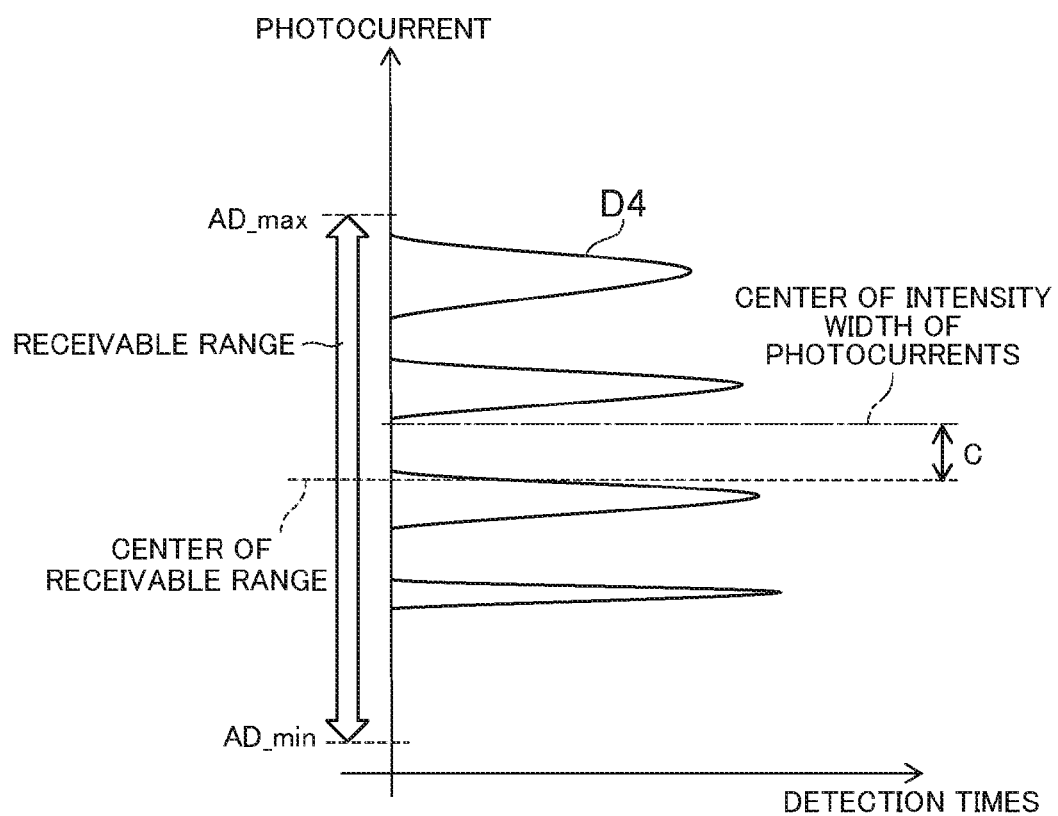
FIG. 5 is a diagram illustrating a histogram of a photocurrent output by a conversion unit and a receivable range of a signal by a reception unit in the optical receiver module according to the first embodiment of the present invention.

FIG. 5 is a diagram illustrating a histogram D4 of a photocurrent output by the conversion unit 11 and a receivable range of a signal by the reception unit 15 in the optical receiver module 1 according to the first embodiment of the present invention. In the same figure, the histogram D4 of the photocurrent is illustrated by representing a magnitude of the photocurrent output from the conversion unit 11 and the number of times of current value detection in the vertical axis and the horizontal axis, respectively. Four peaks illustrated in the histogram D4 correspond to four signals of a 4-ary optical intensity signal. Each of four peaks may include a contribution of noise such as thermal noise or shot noise. The noise may occur during transmission of an optical signal or during conversion of the signal by the conversion unit 11.

The offsetting unit 12 according to the present embodiment offsets a photocurrent, which is an electrical signal, such that a difference between a center of an intensity width of the photocurrent, which is the electrical signal, and a center of a signal intensity range (receivable range) of a signal capable of being received by the reception unit 15 becomes small. The offset amount by the offsetting unit 12 may be set as a third amount C which is a difference between the center of the intensity width of the photocurrent and the center of the receivable range of the signal by the reception unit. In a case of the present embodiment, the receivable range of the signal by the reception unit 15 is defined by a convertible range of the AD conversion unit 14. That is, the maximum value of the receivable range is the maximum value AD_max of the convertible range of the AD conversion unit 14 and the minimum value of the receivable range is the minimum value AD_min of the convertible range of the AD conversion unit 14. The value of the center of the receivable range is (AD_max+AD_min)/2.

Figure 6:
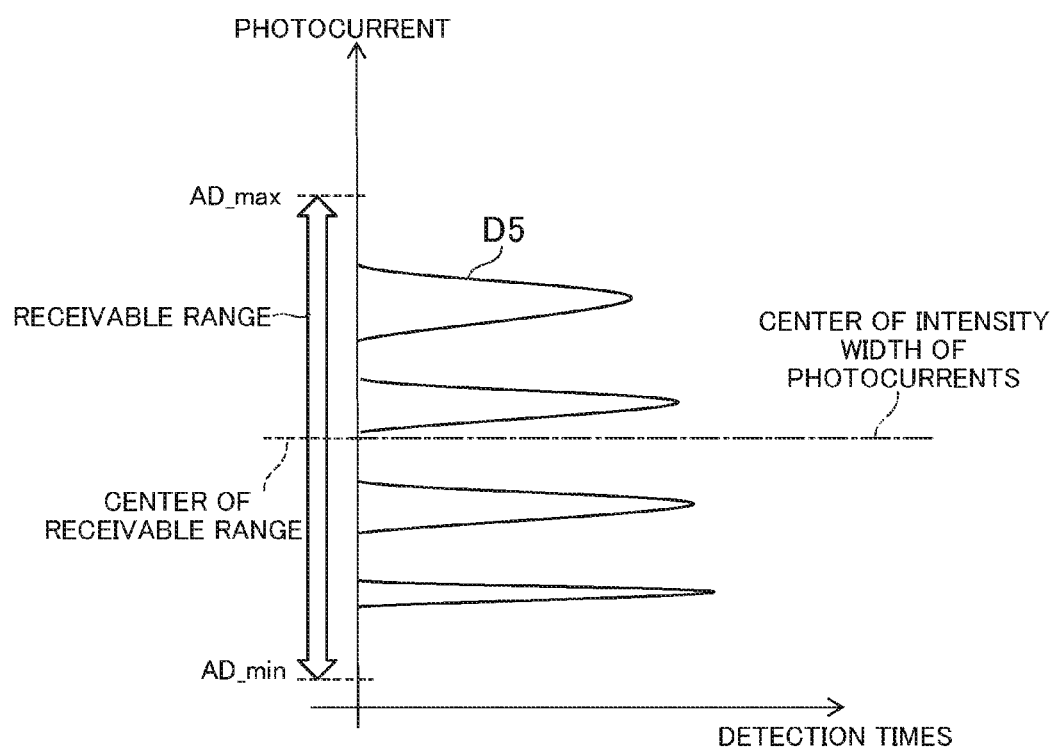
FIG. 6 is a diagram illustrating a histogram of a photocurrent offset by an offsetting unit and the receivable range of the signal by the reception unit according to the first embodiment of the present invention.

FIG. 6 is a diagram illustrating a histogram D5 of a photocurrent which is offset by the offsetting unit 12 and a receivable range of a signal by the reception unit 15 according to the first embodiment of the present invention. The photocurrent is offset by the third amount C and as a result, the center of an intensity width of the photocurrent coincides with the center of the receivable range of the signal by the reception unit 15.

Figure 7:
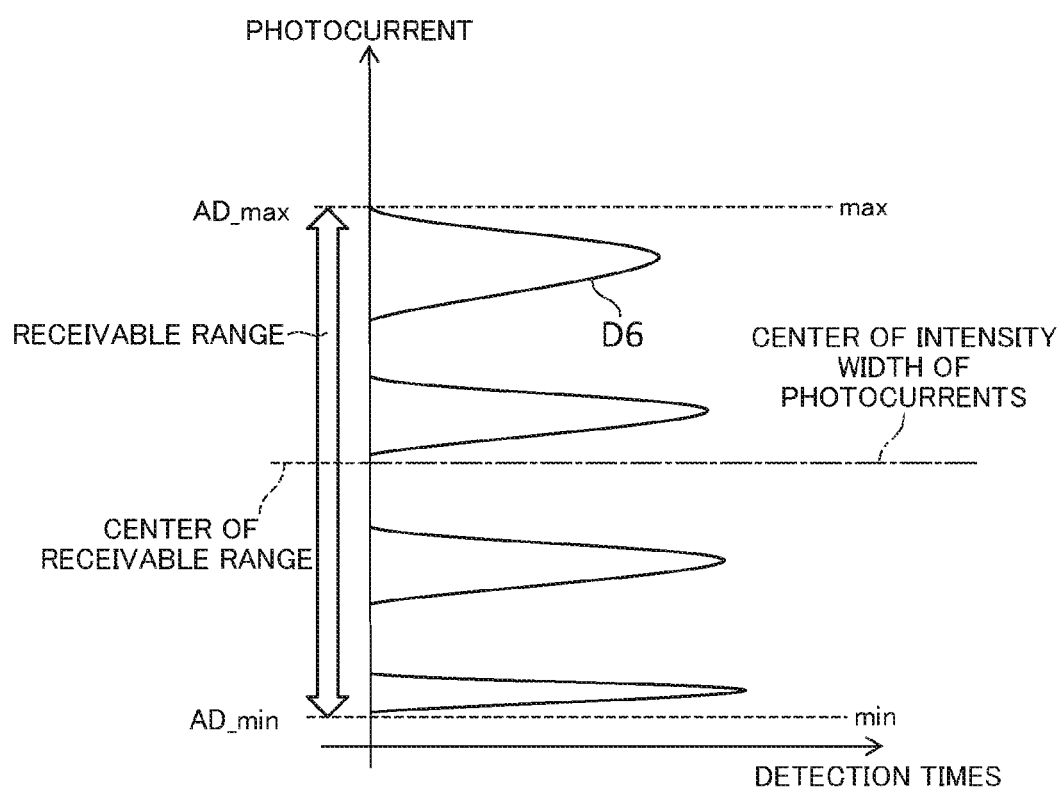
FIG. 7 is a diagram illustrating a histogram of a photocurrent amplified by an amplification unit and the receivable range of the signal by the reception unit according to the first embodiment of the present invention.

FIG. 7 is a diagram illustrating a histogram D6 of a photocurrent amplified by the amplification unit 13 and a receivable range of a signal by the reception unit 15 according to the first embodiment of the present invention. The amplification unit 13 may amplify the photocurrent such that both the minimum value and maximum value of the photocurrent offset by the offsetting unit 12 do not exceed the receivable range of the signal by the reception unit 15. In a case of the present example, the maximum value (max) of the amplified photocurrent which is an amplified signal output by the amplification unit 13 coincides with the maximum value AD_max of the receivable range of the signal by the reception unit 15 and the minimum value (min) of the signal by the amplified photocurrent coincides with the minimum value AD_min of the receivable range of the signal by the reception unit 15.

The maximum value of the amplified photocurrent, does not necessarily coincide with the maximum value of the receivable range of the signal by the reception unit 15 and may be smaller than the maximum value of the receivable range by about several percent (%). More specifically, regarding the peak of the photocurrent corresponding to the optical signal of the upper most level, in a case where the standard deviation of the peak is represented by $\sigma_1$, the amplification unit 13 may also amplify the electrical signal such that the maximum value (max) of the photocurrent becomes about several times of the $\sigma_1$ smaller than the maximum value AD_max of the receivable range of the signal by the reception unit 15. Regarding the peak of the photocurrent corresponding to the optical signal of the lower most level, in a case where the standard deviation of the peak is represented by $\sigma_2$, the amplification unit 13 may also amplify the electrical signal such that the minimum value (min) of the photocurrent becomes about several times of the $\sigma_2$ larger than the minimum value AD_min of the receivable range of the signal by the reception unit 15.

According to the optical receiver module 1 of the present embodiment, the center of the intensity width of the amplified signal is appropriately offset by the offsetting unit 12, the intensity range of the signal capable of being received by the reception unit 15 may be thoroughly utilized, and even when the magnitudes of noise differs between different optical signals, the optical signal may be received with a high accuracy.

Referring back to FIG. 1, the optical receiver module 1 according to the present embodiment may include a measurement unit 20 which measures at least the maximum value and the minimum value of the intensity of the amplified signal. The measurement unit 20 according to the present embodiment measures the intensity of the digital signal output from the AD conversion unit 14 and may also measure an analog signal. The signal intensity measured by the measurement unit 20 is input to a control unit 21. The control unit 21 may include an amplification amount calculation unit 21b which calculates the amplification amount by the amplification unit 13. The amplification amount calculation unit 21b calculates the amplification amount such that the maximum value of the intensity of the amplified signal becomes less than or equal to the maximum value of the intensity range of the signal capable of being received by the reception unit 15 and the minimum value of the intensity of the amplified signal becomes greater than or equal to the minimum value of the intensity range of the signal capable of being received by the reception unit 15. The amplification unit 13 may amplify the electrical signal according to the amplification amount calculated by the amplification amount calculation unit 21b such that the maximum value of the intensity of the amplified signal becomes less than or equal to the maximum value of the signal intensity range and the minimum value of the intensity of the amplified signal becomes greater than or equal to the minimum value of the signal intensity range.

According to the optical receiver module 1 of the present embodiment, it is possible to feed a measured result of the amplified signal back and control the amplification unit 13 such that the amplified signal surely falls within the receivable range of the signal by the reception unit 15. With this, even in a case where the intensity of the optical signal is changed temporarily, it is possible to change the amplification factor of the amplification unit 13 by following up the change and always keep the reception accuracy high.

The optical receiver module 1 according to the present embodiment may include an offset amount calculation unit 21a. The offset amount calculation unit 21a is included in the control unit 21 and calculates an amount offset by the offsetting unit 12. The offset amount calculation unit 21a calculates the offset amount of the electrical signal based on the intensity of the amplified signal measured by the measurement unit 20. The offsetting unit 12 offsets the electrical signal according to the offset amount calculated by the offset amount calculation unit 21a.

According to the optical receiver module 1 according to the present embodiment, it is possible to feed the measured result of the amplified signal back to the offsetting unit 12 to offset the electrical signal such that the difference between the center of an intensity width of the electrical signal and the center of the intensity range of the signal capable of receiving by the reception unit 15 becomes small. With this, even in a case where the intensity of the optical signal is changed temporarily, it is possible to change the offset amount of the offsetting unit 12 by following up the change and always keep the reception accuracy high.

The measurement unit 20 measures at least the maximum value and the minimum value of the intensity of the amplified signal for a predetermined period of time (for example, a period of time amounting to a million times of a symbol period of signal). When it is regarded that the maximum value and the minimum value of the amplified signal are respectively represented as max and min and the maximum value and the minimum value of the receivable range of the signal by the reception unit 15 are respectively represented as AD_max and AD_min, the offset amount calculation unit 21a may calculate the offset amount by ((AD_max+AD_min)−(max+min))/2. The amplification amount calculation unit 21b may calculate the amplification factor by (AD_max−AD_min)/(max−min). The offset amount may be a positive value or a negative value and an offset direction of the electrical signal (shift direction) is determined according to the sign of the offset amount.

Second Embodiment

Figure 8:
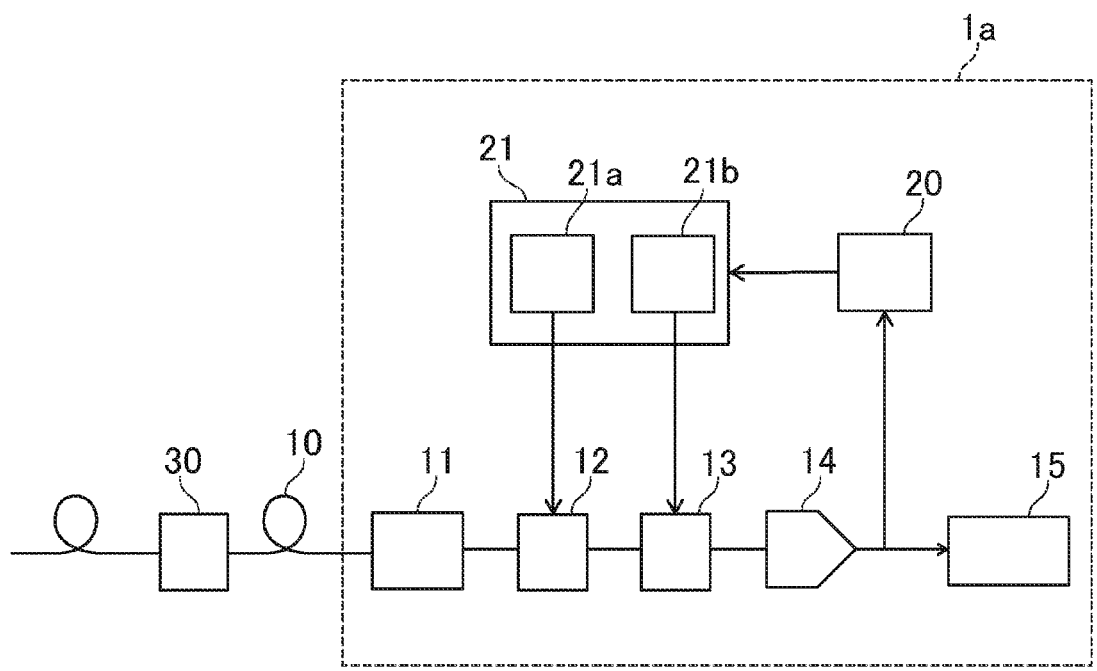
FIG. 8 is a diagram illustrating a configuration of an optical receiver module according to a second embodiment of the present invention.

FIG. 8 is a diagram illustrating a configuration of an optical receiver module 1a according to a second embodiment of the present invention. The optical receiver module 1a is different from the optical receiver module 1 according to the first embodiment in that an optical signal input to the conversion unit 11 according to the second embodiment is the optical signal amplified by an optical amplifier 30. Other configurations of the optical receiver module 1a according to the present embodiment are the same as those of the optical receiver module 1 of the first embodiment.

In the following, description will be made on what type of noise occurs in the optical signal amplified by the optical amplifier 30. The noise generated by the optical amplifier 30 has characteristics that a noise level becomes larger as a light intensity of an optical signal is increased. For that reason, even when the noise is not generated in conversion by the conversion unit 11, the noise occurring in the photocurrent may not become uniform for each signal. Specifically, the S/N ratio of the optical amplifier 30 becomes a value represented by the following Expression 2.

$$\frac{S}{N} = \frac{(Gn_0 + (G-1)n_{sp})^2}{Gn_0 + (G-1)n_{sp} + 2G(G-1)n_0 n_{sp} + (G-1)^2 n_{sp}^2} \qquad \text{Expression 2}$$

Here, the G represents a signal gain and the $n_0$ represents the number of input photons. The $n_{sp}$ represents a population inversion parameter.

Among amount represented in a denominator of the right side of Expression 2, the $Gn_0$ which is the first term represents a contribution of the shot noise of an amplified signal light and the $(G-1)n_{sp}$ which is the second term represents a contribution of the shot noise of spontaneous emission light. The $2G(G-1)n_0 n_{sp}$ which is the third term represents a contribution of beat noise of the amplified signal light and the spontaneous emission light and the $(G-1)^2 n_{sp}^2$ which is the fourth term represent a contribution of beat noise of the spontaneous emission light and the spontaneous emission light. Among the terms, in a case where the light intensity of the optical signal is large, the first term and the second term are relatively small and thus, may be neglected. However, the remaining noise is relatively large in the third term and the fourth term and thus, the third term and the fourth term may not be neglected. In particular, the third term corresponds to a noise occurring at the same wavelength as the wavelength of the optical signal and thus, it is difficult for an optical filter to remove the third item which causes degradation of the S/N ratio. The amount of the third term becomes larger as the intensity of the optical signal is increased and thus, a magnitude of noise changes for each multi-level optical intensity signal.

The optical receiver module 1a according to the present embodiment is able to thoroughly utilize the intensity range of the signal capable of being received by the reception unit 15 through offsetting of the electrical signal by the offsetting unit 12 and the amplification of the electrical signal by the amplification unit 13 even in a case where the noise occurs in an optical signal according to the intensity of the optical signal as described above and receive the optical signal with a high accuracy even in a case where the magnitudes of noise between different optical signals differ.

Third Embodiment

Figure 9:
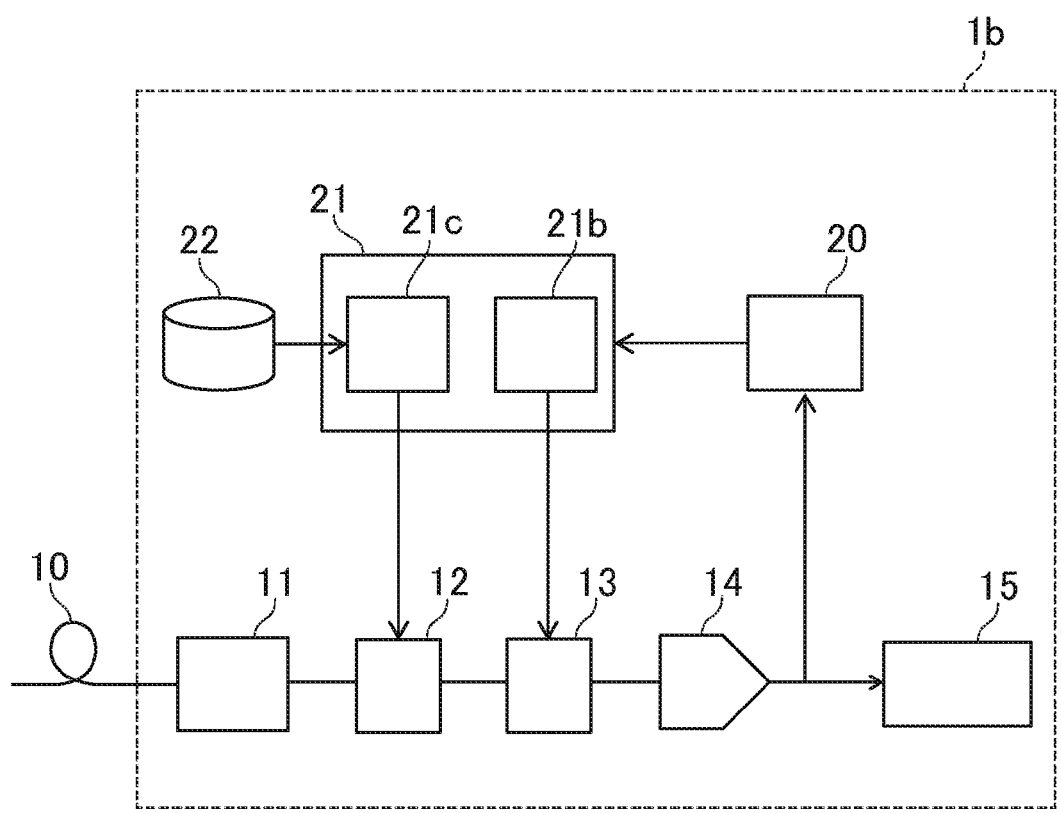
FIG. 9 is a diagram illustrating a configuration of an optical receiver module according to a third embodiment of the present invention.

FIG. 9 is a diagram illustrating a configuration of an optical receiver module 1b according to a third embodiment of the present invention. The optical receiver module 1b according to the present embodiment is different from the optical receiver module 1 according to the first embodiment in that the optical receiver module 1b may include a storage unit 22 which stores a relationship between the intensity and the offset amount of the amplified signal and an offset amount selection unit 21c which selects an offset amount of the electrical signal based on the intensity of the amplified signal measured by the measurement unit 20 and the relationship between the intensity and the offset amount of the amplified signal stored in the storage unit 22. Other configurations of the optical receiver module 1b according to the present embodiment are the same as those of the optical receiver module 1 of the first embodiment.

The relationship between the intensity and the offset amount of the amplified signal is stored in the storage unit 22 according to the present embodiment in advance. The storage unit 22 may store, for example, the relationship between the maximum value or the minimum value of the amplified signal and the offset amount. The offset amount selection unit 21c compares the intensity of the amplified signal measured by the measurement unit 20 with the relationship between the offset amount and the intensity of the amplified signal stored in the storage unit 22 to select the offset amount. In the storage unit 22, a plurality of reference values of the intensity of the amplified signal and offset amounts which respectively correspond to the plurality of reference values may be stored. In this case, the offset amount selection unit 21c may select a reference value which is closest to the intensity of the amplified signal measured by the measurement unit 20 and select a corresponding offset amount.

According to the optical receiver module 1b of the present embodiment, a computation of an offset amount is not needed and a computation load of the control unit 21 is reduced. The intensity range of the signal capable of being received by the reception unit 15 may be thoroughly utilized and even when the magnitudes of noise between different optical signals differ, the optical signal may be received with a high accuracy.

The embodiments of the present invention are not limited to the matters described above. For example, the offsetting unit 12 may also set the electrical signal to be offset by only the predetermined amount to omit the control by the control unit 21. Similarly, the amplification unit 13 may also set the electrical signal to be amplified by only the predetermined amount to omit the control by the control unit 21.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An optical receiver module comprising:
   a conversion unit which converts an input optical signal to an electrical signal;
   an amplification unit which amplifies the electrical signal and outputs an amplified signal;
   a reception unit which directly or indirectly receives the amplified signal and which is configured to receive the amplified signal in a signal intensity range;
   an offsetting unit which offsets the electrical signal by an offset amount such that a difference between a center of an intensity width of the electrical signal and a center of the signal intensity range of the reception unit is reduced; and
   a measurement unit which measures at least a maximum value and a minimum value of the intensity of the amplified signal,
   wherein the amplification unit amplifies the electrical signal such that the maximum value of the intensity of the amplified signal becomes less than or equal to a maximum value of the signal intensity range and the minimum value of the intensity of the amplified signal becomes greater than or equal to a minimum value of the signal intensity range, and
   wherein the offsetting unit includes an offset amount calculation unit which calculates the offset amount of the electrical signal based on the intensity of the amplified signal measured by the measurement unit.

2. The optical receiver module according to claim 1, further comprising:
   an AD conversion unit which converts the amplified signal to a digital signal to be output to the reception unit.

3. The optical receiver module according to claim 1, wherein the conversion unit includes an avalanche photodiode.

4. The optical receiver module according to claim 1, wherein the optical signal is an optical signal amplified by an optical amplifier.

5. The optical receiver module according to claim 1, wherein the optical signal is a multi-level optical intensity signal of 4-ary or more values.

6. An optical receiver module comprising:
   a conversion unit which converts an input optical signal to an electrical signal;
   an amplification unit which amplifies the electrical signal and outputs an amplified signal;
   a reception unit which directly or indirectly receives the amplified signal and which is configured to receive the amplified signal in a signal intensity range;
   an offsetting unit which offsets the electrical signal by an offset amount such that a difference between a center of an intensity width of the electrical signal and a center of the signal intensity range capable of the reception unit is reduced; and
   a measurement unit which measures at least a maximum value and a minimum value of the intensity of the amplified signal,
   wherein the amplification unit amplifies the electrical signal such that the maximum value of the intensity of the amplified signal becomes less than or equal to a maximum value of the signal intensity range and the minimum value of the intensity of the amplified signal becomes greater than or equal to a minimum value of the signal intensity range, and wherein the offsetting unit includes:

a storage unit which stores a relationship between the intensity of the amplified signal and the offset amount of the electrical signal, and an offset amount selection unit which selects the offset amount of the electrical signal based on the intensity of the amplified signal measured by the measurement unit and the relationship between the offset amount and the intensity of the amplified signal stored in the storage unit.

7. The optical receiver module according to claim 6, further comprising:

an AD conversion unit which converts the amplified signal to a digital signal to be output to the reception unit.

8. The optical receiver module according to claim 6, wherein the conversion unit includes an avalanche photodiode.

9. The optical receiver module according to claim 6, wherein the optical signal is an output signal amplified by an optical amplifier.

10. The optical receiver module according to claim 6, wherein the optical signal is a multi-level optical intensity signal of 4-ary or more values.

* * * * *